(12) United States Patent
Kaplan et al.

(10) Patent No.: US 12,499,057 B2
(45) Date of Patent: Dec. 16, 2025

(54) SEGMENTED NON-CONTIGUOUS REVERSE MAP TABLE

(71) Applicants: ADVANCED MICRO DEVICES, INC., Santa Clara, CA (US); ATI TECHNOLOGIES ULC, Markham (CA)

(72) Inventors: David Kaplan, Austin, TX (US); Jelena Ilic, Austin, TX (US); Nippon Raval, Markham (CA); Philip Ng, Toronto (CA)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 10 days.

(21) Appl. No.: 18/090,631

(22) Filed: Dec. 29, 2022

(65) Prior Publication Data

US 2024/0220417 A1    Jul. 4, 2024

(51) Int. Cl.
*G06F 12/1036* (2016.01)
*G06F 12/14* (2006.01)
G06F 12/1009 (2016.01)
G06F 12/1081 (2016.01)
G06F 12/109 (2016.01)

(52) U.S. Cl.
CPC .. *G06F 12/1036* (2013.01); *G06F 2212/1052* (2013.01)

(58) Field of Classification Search
CPC ............... G06F 12/1036; G06F 2212/1052

USPC ........................................... 711/208
See application file for complete search history.

(56) References Cited

U.S. PATENT DOCUMENTS

| 10,509,736 B2 | 12/2019 | Raval et al. |
| 2005/0050294 A1* | 3/2005 | Horn ............... G06F 3/0607 711/114 |
| 2014/0220960 A1* | 8/2014 | Nagel .............. H04W 24/10 455/466 |
| 2018/0032447 A1* | 2/2018 | Kaplan .............. G06F 9/52 |
| 2018/0189190 A1* | 7/2018 | Kaplan ........... G06F 9/45545 |
| 2018/0232320 A1 | 8/2018 | Raval et al. |
| 2020/0192825 A1 | 6/2020 | Ng et al. |
| 2020/0257828 A1 | 8/2020 | Durham et al. |
| 2022/0043757 A1 | 2/2022 | Durham et al. |
| 2022/0308755 A1* | 9/2022 | Ng ................. G06F 9/45558 |

OTHER PUBLICATIONS

International Search Report and Written Opinion issued in Application No. PCT/US2023/086045, mailed May 8, 2024, 11 pages.

(Continued)

*Primary Examiner* — Arpan P. Savla
*Assistant Examiner* — Sidney Li (57) ABSTRACT

A computing device comprises a processor, a table walker, and a memory storing a segmented reverse map table in multiple non-contiguous portions of the memory. The table walker is configured to translate a virtual memory address specified by a memory access request to a physical memory address associated with the virtual memory address; and provide a requester associated with the memory access request with access to the associated physical memory address in response to an indication at the reverse map table that the requester is authorized to access the associated physical memory address.

20 Claims, 5 Drawing Sheets

(56) References Cited

OTHER PUBLICATIONS

Advanced Micro Devices, "AMD64 Programming Manual, vol. 2: System Programming", Publication No. 24593, Revision 3.39, Oct. 2022, 806 pages.
Advanced Micro Devices, "AMD SEV-SNP: Strengthening VM Isolation With Integrity Protection and More", White Paper, Jan. 2020, 20 pages.
International Preliminary Report on Patentability mailed Jul. 10, 2025 for PCT/US2023/086045, 7 pages.

* cited by examiner

| GSP 402 | GUEST ID 404 | GUEST PHY ADDR 406 | SUB-PAGE COUNT 408 | SIZE 410 | ASSIGNED 412 | LOCK 414 | IMMT 416 | VALIDATED 418 | VMPL BLOCK 420 |
|---|---|---|---|---|---|---|---|---|---|
| GSP 402 | GUEST ID 404 | GUEST PHY ADDR 406 | SUB-PAGE COUNT 408 | SIZE 410 | ASSIGNED 412 | LOCK 414 | IMMT 416 | VALIDATED 418 | VMPL BLOCK 420 |
| ... | | | | | | | | | |
| GSP 402 | GUEST ID 404 | GUEST PHY ADDR 406 | SUB-PAGE COUNT 408 | SIZE 410 | ASSIGNED 412 | LOCK 414 | IMMT 416 | VALIDATED 418 | VMPL BLOCK 420 |

ENTRY 400

RMT SEGMENT 443

SEGMENTED NON-CONTIGUOUS REVERSE MAP TABLE

BACKGROUND

Some computing devices execute virtual machines (VMs), which are software entities that emulate or otherwise interface with the hardware of the computing devices in order to provide support for executing software programs. For example, a virtual machine may use hardware elements in a computing device (processors, memories, network interfaces, etc.) to provide support for running one or more instances of operating systems (OS), called guest operating systems. The guest operating systems in turn provide support for executing other software programs such as applications and databases.

Some of the computing devices execute two or more virtual machines concurrently (e.g., in corresponding time slices, in parallel on one or more processing cores, etc.). In such computing devices, each virtual machine may have access to hardware resources that are allocated exclusively for the use of the virtual machine. For example, each virtual machine may be allocated a corresponding region of a memory in a computing device for the exclusive use of the virtual machine. In these computing devices, a first virtual machine may be prevented from accessing a region of memory allocated to a second virtual machine and vice versa. In some of these computing devices, a hypervisor (also termed a VMM, a virtual machine monitor or virtual machine manager) enforces access controls for each virtual machine. Hypervisors are software entities that operate/execute on computing devices and function as a manager or controller for virtual machines executing on the computing device. For example, hypervisors may start or initialize virtual machines, control accesses of computing device hardware by virtual machines, terminate or close virtual machines, etc.

BRIEF SUMMARY OF SELECTED EMBODIMENTS

In an embodiment, a method for handling memory accesses in a computing system includes receiving a memory access request specifying a virtual memory address; identifying a physical memory address associated with the virtual memory address; determining, based on a segmented reverse map table that is stored in non-contiguous portions of a physical memory of the computing system, whether a requester associated with the memory access request is authorized to access the associated physical memory address; and, responsive to determining that the requester is authorized to access the physical memory address, providing the requester with access to the identified physical memory address, and otherwise preventing the access to the identified physical memory address.

The segmented reverse map table may include an RMT segment index comprising multiple index entries that each correspond to one of multiple segments of the RMT that are stored in the non-contiguous portions of the physical memory.

Each segment of the multiple segments may comprise a plurality of segment entries, each segment entry corresponding to a distinct physical address.

The computing system may execute one or more virtual machines that are each allocated a portion of physical memory, such that the segment entries of the multiple segments comprise an entirety of the physical memory that is allocated to the one or more virtual machines.

The physical memory of the computing system may include multiple non-uniform memory access (NUMA) memory nodes, such that each segment of the multiple segments maps to a respective NUMA memory node. At least one segment of the multiple segments may be stored on the respective NUMA memory node mapped by the at least one segment.

The RMT segment index may further include an RMT counter table including one or more counters that are each associated with one or more encryption keys.

Identifying the physical memory address may be performed by a table walker of the computing system. The requester may be an input/output (I/O) device communicatively coupled to the computing system, such that the table walker is a hardware table walker associated with an I/O memory management unit (IOMMU) of the computing system.

The requester may be one of one or more VMs executing on the computing system that are each allocated a respective plurality of physical memory addresses.

In an embodiment, a computing device may include a processor, a table walker, and a memory storing a segmented reverse map table (RMT) in multiple non-contiguous portions of the memory. The table walker is configured to receive a memory access request specifying a virtual memory address; to identify a physical memory address associated with the virtual memory address; to determine, based on the segmented reverse map table, whether a requester associated with the memory access request is authorized to access the associated physical memory address; and, responsive to a determination that the requester is authorized to access the physical memory address, to provide the requester with access to the identified physical memory address, and otherwise prevent the access to the identified physical memory address.

The segmented reverse map table may include an RMT segment index comprising multiple index entries that each correspond to one of multiple segments of the RMT that are stored in the non-contiguous portions of the memory. Each segment of the multiple segments may include a plurality of segment entries that each corresponds to a distinct physical address of the memory.

The computing device may execute one or more virtual machines that are each allocated a portion of the memory, such that the segment entries of the multiple segments comprise an entirety of the memory that is allocated to the one or more virtual machines.

The memory may include multiple non-uniform memory access (NUMA) memory nodes, such that each segment of the multiple segments maps to a respective NUMA memory node. At least one segment of the multiple segments may be stored on the respective NUMA memory node mapped by the at least one segment.

The RMT segment index may further include an RMT counter table that includes one or more counters, such that each of the one or more counters are associated with one or more encryption keys.

The computing device may further include an input/output (I/O) memory management unit (IOMMU), such that the requester is an I/O device communicatively coupled to the computing device, and wherein the table walker is a hardware table walker associated with the IOMMU.

The computing device may further include one or more virtual machines executing on the computing device that are each allocated a respective plurality of physical memory addresses, such that the requester is one of the one or more virtual machines.

In an embodiment, a computing device is configured to store a segmented reverse map table (RMT) in multiple non-contiguous portions of a memory having a plurality of physical memory addresses, the segmented RMT comprising an RMT segment index comprising multiple index entries that each correspond to one of multiple segments of the segmented RMT that are stored in the non-contiguous portions of the memory; to translate a virtual memory address specified by a memory access request to a physical memory address associated with the virtual memory address; and to provide a requester associated with the memory access request with access to the associated physical memory address in response to an indication at the segmented RMT that the requester is authorized to access the associated physical memory address.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Although hypervisors are assumed to provide access controls for virtual machines, a hypervisor may not always properly enforce the access controls. For example, the program code for a hypervisor may be replaced with malicious program code, a hypervisor's program code may become corrupted or include an error, etc. In such cases, a hypervisor may deliberately or unintentionally allow a virtual machine to access computing hardware allocated to another virtual machine. For example, in some computing devices, a hypervisor is responsible for providing address information to enable virtual machines to access data in corresponding areas of memory. In these computing devices, the hypervisor provides translations between local and/or virtual addresses used by virtual machines (or software executing thereon) and the physical addresses where data is actually located in memory. When the hypervisor is not functioning correctly, the hypervisor may provide incorrect address information, thereby directing virtual machines to access data in unexpected or unwanted areas of memory (e.g., areas of memory allocated to other virtual machines). By providing incorrect address information as described, a hypervisor can cause data to be accessed in violation of one or more access controls or rules.

In addition to the address translations provided by the hypervisor being used by virtual machines, in some of these computing devices, the address translations are used by input-output (IO) devices to access pages of memory allocated to particular virtual machines. For example, when interacting with a virtual machine, an input/output (I/O) device (such as a disk controller, a network interface device, a Peripheral Component Interface Express or PCIe bus device, graphics processing unit (GPU), etc.) performs a direct memory access (DMA) operation to write data in one or more pages of memory that are allocated to the virtual machine. Similar to the operations involving virtual machines described above, operations performed by I/O devices can be maliciously or erroneously misdirected when the hypervisor provides incorrect address information.

As discussed herein, a computing device uses virtual memory to handle data accesses by programs being executed in the computing device or by input/output (IO) devices interacting with the computing device. For example, the executed programs may include applications, operating systems, device drivers, virtual machines, firmware, etc. Generally, when data is accessed by a program or an I/O device in the computing device, a block or page of memory of a given size (e.g., 4 kB, 2 MB, etc.) that includes the data is copied from mass storage (e.g., a disk drive or semiconductor memory) to an available physical location in a memory in the computing device or is newly created in the memory. In order to avoid programs and I/O devices being required to keep track of the physical locations of pages in memory, the computing device keeps track of the physical locations of the pages for the programs or I/O devices. The programs and I/O devices access memory using virtual addresses in virtual address spaces, which are local address spaces that are specific to corresponding programs or I/O devices, instead of accessing memory using addresses based on the physical locations of pages (or physical addresses). From a program's or an I/O device's perspective, virtual addresses indicate the actual physical locations where data is stored in memory, and memory accesses are made by programs and I/O devices using the virtual addresses accordingly. The virtual addresses, however, may not map directly to the physical addresses of the physical locations where data is stored in pages in the memory. As part of keeping track the physical locations of pages, the computing device translates the virtual addresses used by the programs and I/O devices in memory access requests into the physical addresses where the data is actually located. The computing device then uses the physical addresses to perform the memory accesses for the programs and I/O devices.

In order to enable virtual address to physical address translations, the computing device includes a page table. The page table is a record stored in a memory of the computing device that includes an entry, or a page table entry, with virtual address to physical address translation information for pages of data that are stored in the memory. In other words, the page table includes mappings of virtual addresses to corresponding physical addresses. Upon receiving a request from a program or an I/O device to access memory at a given virtual address, the computing device acquires corresponding physical address information from the page table by performing a page table walk, during which the page table is searched for a page table entry that provides the physical address associated with the virtual address. Because such page table walks are relatively slow, it is desirable to avoid performing page table walks when possible.

The computing device therefore includes translation lookaside buffers (TLBs), which are local caches that are used for storing a limited number of copies of address translation information acquired during page table walks (i.e., information based on page table entries). For example, a processing core, an input-output memory management unit (IOMMU) via which an I/O device accesses memory, or an I/O device may include a corresponding TLB for locally storing copies of information based on page table entries. During operation, the processing core, IOMMU, or I/O device first attempts to acquire cached page table entries from the corresponding TLB for performing virtual address to physical address translations. When the copy of the corresponding page table entry is not present in the TLB (i.e., when a miss occurs), the processing core or the IOMMU performs a page table walk to acquire the desired page table entry—and caches a copy of the acquired page table entry in the TLB.

Secure virtual machine architectures provide hardware resources that allow a single physical machine to run multiple operating systems efficiently, while maintaining secure, hardware-enforced isolation. A hypervisor or virtual machine manager (VMM) controls execution of multiple guest operating systems on a single physical machine by intercepting and emulating in a safe manner sensitive operations of the guest VM such as modifying page tables, which could give the guest VM access to memory it is not allowed to access, or accessing peripheral devices that are shared among multiple guest VMs. A page table is a data structure used by a virtual memory system to store a mapping between virtual memory addresses and physical memory addresses. The VMM provides each guest VM the appearance of full control over a complete computer system (memory, central processing unit (CPU), and all peripheral devices). A guest VM may have one or more virtual CPUs (vCPUs) managed by the guest OS, just as on a non-virtualized system, and a VMM may run any mix of vCPUs from the same or different guests on different logical processors substantially simultaneously.

In certain secure computing systems, code and data associated with an encrypted VM are secured such that a decrypted version of that code and data is available only within the VM itself. Each encrypted VM is associated with a unique encryption key, such that if data is accessed by a different entity using a different key, the encrypted VM's code and/or data will be decrypted with an incorrect key, leading to unintelligible results. In such secure computing systems, the supervising VMM is no longer able to inspect or alter all guest code or data. The VM may mark data memory pages as either private or shared, thus allowing selected pages to be shared outside the encrypted VM. Private memory is encrypted using a VM-specific key, while shared memory is accessible to the VMM. Such measures provide integrity protection of VM memory to help prevent hypervisor-based attacks that rely on guest data corruption, aliasing, replay, and various other attack vectors.

In embodiments discussed herein, a reverse map table (RMT) is used to enforce data integrity protection for encrypted VMs. The RMT is checked during page table walks by both the CPU and IOMMU to determine if a page may be accessed. In certain embodiments, the RMT is also used to ensure that a hypervisor (and/or another entity in the computing device) has not remapped translations from guest physical addresses to system physical addresses in a nested page table. The RMT includes information that can be used to determine, inter alia, whether a system physical address acquired during a table walk of a nested page table for a guest physical address matches a previously-used system physical address. In other words, the RMT is used to ensure that a system physical address for a given page in memory is matched to only one guest physical address at a time, and to control access by I/O devices and virtual machines to pages in memory that are allocated to virtual machines.

By using the RMT, the described embodiments enable the detection of potentially malicious or erroneous modifications of the nested page table. Avoiding such modifications of the nested page table can improve the security of data for virtual machines in the computing device by avoiding the hypervisor (and/or another entity) improperly remapping guest physical addresses to system physical addresses to direct virtual machines to access (e.g., read, overwrite, execute, etc.) data in unknown, unwanted, or incorrect areas of memory (including areas of memory allocated to other virtual machines). Thus, use of the RMT improves security of data by enforcing rules such as: each page in memory is only permitted to be associated with a single/unique guest physical address (no guest physical address aliasing is allowed), and in-use private guest pages cannot be remapped without involving/informing the corresponding virtual machine as described herein. In addition, alone or in combination with other techniques, such as encryption of virtual machine memory regions and protection for virtual machine processor state (e.g., registers, etc.), the described embodiments avoid the need for implicit trust in hypervisors, which simplifies administration, improve security, etc. for computing devices. The described embodiments therefore improve the security, operational stability, and value to consumers of computing devices.

In previous implementations, a single RMT table occupies a single contiguous memory region for the entire system. Such implementations are associated with multiple disadvantages. As one example, the use of a single contiguous memory region for the RMT can result in over-allocation of the RMT in certain memory configurations, such as if a system address space is non-contiguous. Thus, if a computing system with 512 GB of RAM in each of two partitions includes non-contiguous DRAM addresses (e.g., from 0-512 GB and 1 TB-1.5 TB), a relatively large RMT must be allocated to cover the entire non-contiguous address space (e.g., a 6 GB RMT allocation to cover addresses 0-1.5 TB), even though there may be a sizable hole in that address space (e.g., a 512 GB hole between 0.5-1 TB). As another example, a single contiguous RMT region provides substantially no awareness of non-uniform memory access (NUMA), in which memory access time depends on the memory location relative to the processor. This can result in long-latency RMT accesses during page table walks and in uneven DRAM utilization, as the RMT may consume a portion of memory on only one NUMA node, resulting in a correspondingly less available memory for that node.

Embodiments discussed herein provide a segmented RMT architecture, such that the RMT table itself is split in memory and need not reside in a single physically contiguous location. In certain embodiments utilizing a segmented RMT, a single segment index describes a plurality of RMT segments, each corresponding to a certain range of physical addresses. The size of segments is configurable, enabling flexibility in a variety of system configurations. Because the RMT table may be split in memory and no longer needs to occupy a single physically contiguous location, the segmented RMT architecture avoids the need to over-allocate RMT memory in the presence of non-contiguous address space, as well as making the RMT more efficient in the context of non-uniform memory access.

In certain embodiments, the segmented RMT is resized during runtime if physical memory is added or removed "hot" (that is, during operation and without a system reinitialization process). In such embodiments, the segmented RMT is expanded to protect memory added to the system in this manner, such as by using an unallocated RMT segment index. Additionally, since existing memory (memory in the system prior to the addition of the new memory) may already be fully allocated, memory for the new RMT segment may be allocated within the newly added (and therefore unallocated) memory. If such memory is removed during operation, the segment is updated to be made invalid accordingly.

In certain embodiments, the RMT includes two components, the first containing counters used to enforce security properties when changing encryption keys, and the second containing entries for each page of memory. All CPUs in the system point to the same RMT memory.

Figure 1:
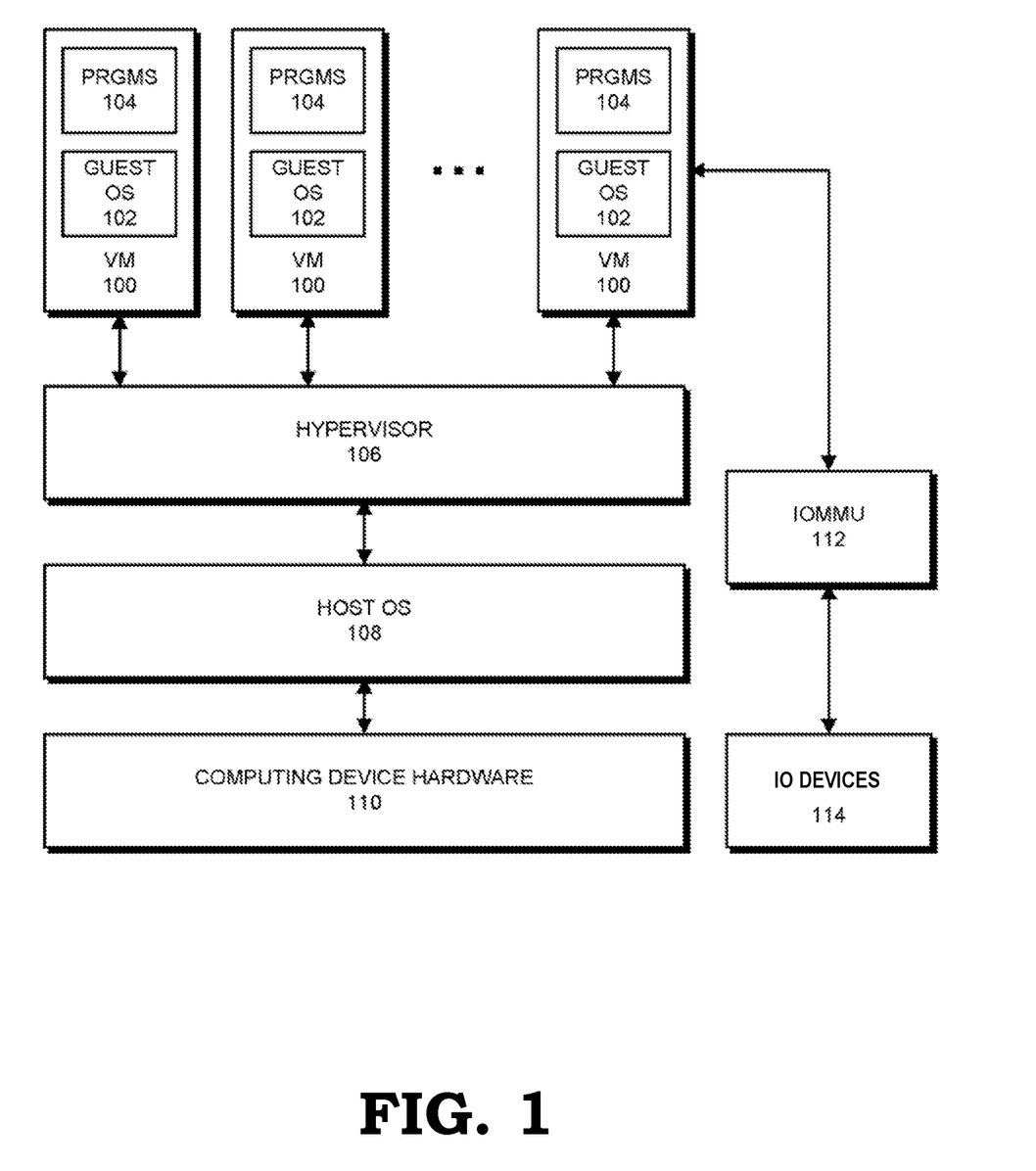
FIG. 1 presents a block diagram illustrating virtual machines and a hypervisor in accordance with some embodiments.

FIG. 1 presents a block diagram illustrating virtual machines and a hypervisor in accordance with some embodiments. In the depicted embodiment, each of three virtual machines (VMs) 100 executes a guest OS 102 and one or more programs 104, such as databases, software applications, etc. The virtual machines 100 communicate with a hypervisor 106, which interfaces between a host OS 108 and the virtual machines 100. Host operating system 108 provides an interface between computing device hardware 110 and hypervisor 106. In addition, in some embodiments, an IOMMU 112 interfaces between I/O devices 114 and the virtual machines 100, such as for direct-mapped I/O devices.

Although particular elements are presented in FIG. 1, in various embodiments, other arrangements of these and other elements are utilized. For example, in some embodiments, host OS 108 is not present and hypervisor 106 communicates directly with computing device hardware 110. As another example, a different number of virtual machines 100 may be present, or IOMMU 112 may interface between more than one virtual machine 100 and I/O devices 114.

In the depicted embodiment, guest operating systems 102, the IOMMU 112, I/O devices 114, and the hypervisor use virtual memory techniques to handle memory requests. A hierarchy of page tables (not shown in FIG. 1) is therefore maintained in the computing device. Within the hierarchy of page tables, guest operating systems 102 and I/O devices are associated with local page tables (e.g., a guest page table or an input-output page table (IO page table)) and the hypervisor 106 is associated with a nested page table. During operation, and using a virtual machine as an example, upon receiving a request from a processor for a translation from a virtual address used by a program executing under a guest operating system to a system physical address, a hardware table walker (e.g., a circuit configured to perform page table walks, not shown) uses the guest page table and the nested page table to perform the translation. More specifically, the table walker uses the guest page table to translate the virtual address used by the program into a guest physical address, which is an address that is local to the guest operating system. Because the guest physical address may not map directly to a location in memory where data (or an instruction, etc.) to be accessed by the program is stored, the table walker uses the nested page table to translate the guest physical address into a system physical address, which is an address that indicates the actual location in memory where the data is stored. Upon acquiring the system physical address, the table walker provides the system physical address for use in accessing the data. The translation to the system physical address may also be cached in a TLB.

In certain embodiments, operations similar to those described above with respect to translation operations for a virtual machine are performed by a hardware IO table walker in an input-output memory management unit (IOMMU) in order to translate an I/O device virtual address into a system physical address for use in accessing data in a page of memory. For example, the IO table walker may acquire a system physical address to enable an I/O device to perform a direct memory access (DMA) operation for writing data in one or more pages of memory allocated to a virtual machine. More specifically, for the translation operation, the IO table walker performs a walk in the IO page table to acquire a guest physical address associated with the I/O device virtual address. The IO table walker then uses the nested page table to translate the guest physical address into a system physical address, which is an address that indicates the actual location in memory where the data is stored. Upon acquiring the system physical address, the IO table walker uses the system physical address for accessing memory. The IOMMU may also cache the translation to the system physical address in a TLB in the IOMMU.

In the described embodiments, the hypervisor can perform various operations on information in the nested page table. For example, hypervisor can update (i.e., overwrite) mappings from guest physical addresses to system physical addresses, etc. As described below, the described embodiments perform operations to ensure that information in the nested page table has not been changed by the hypervisor (maliciously, erroneously, etc.) in such a way that incorrect mappings/translations are provided by the hypervisor.

In the described embodiments, pages in a memory of a computing device can be "private" pages that are allocated for the exclusive use of a given virtual machine among multiple virtual machines executed by the computing device. In these embodiments, I/O devices (e.g., disk controllers, network interface devices, PCIe bus devices, etc.) are permitted, in certain circumstances, to access private pages of memory to enable interaction with the virtual machines to which the pages are allocated. For example, a disk controller may access a page of memory to write data therein that is destined for the corresponding virtual machine or a software program running thereon. In the described embodiments, various operations are performed by an input-output memory management unit (IOMMU) and other functional blocks in the computing device to ensure that pages that have been allocated to virtual machines are protected against unwanted accesses by I/O devices. For example, the described embodiments include a reverse map table (RMT) that is used to control access by I/O devices and virtual machines to pages in memory that are allocated to virtual machines. As another example, in the described embodiments, data in a virtual machine's pages may be encrypted so that only I/O devices with a specified key are able to encrypt/decrypt the data to enable accesses.

In some embodiments, the one or more other checks of the information in the reverse map table include checks of information in the entry in the reverse map table that indicates whether the I/O device—or the corresponding virtual machine, whose identifier, etc., the I/O device uses when accessing the corresponding page—is permitted to perform the requested access in the page of memory. For example, in some embodiments, the entry in the reverse map table includes a recorded guest identifier (ID) that identifies the virtual machine to which the page is allocated. In some embodiments, I/O devices provide identifiers (e.g., a peripheral component interface (PCI) bus/device/function or BDF identifier) at startup or another time and the IO table walker, upon receiving an access request from the I/O device, uses the I/O device identifier to look up a guest ID in a mapping table in which the IOMMU maintains mappings from I/O device identifiers to guest IDs. When the recorded guest ID and the guest ID associated with the I/O device from the mapping table do not match, the page is currently recorded as being allocated to a different virtual machine than is associated with the I/O device, and the IO table walker determines that the system physical address is not to be provided for use in performing the requested access for the I/O device. In this case, the IO table walker halts/fails the translation and signals an error message or fault to the I/O device. Depending on the embodiment, there may be additional checks of the information in the reverse map table to determine if the I/O device is permitted to perform the requested access. When all the checks pass, e.g., when the recorded guest ID and the guest ID associated with the I/O device match, etc., the IO table walker determines that the system physical address can be provided for use in performing the requested access for the I/O device.

Figure 2:
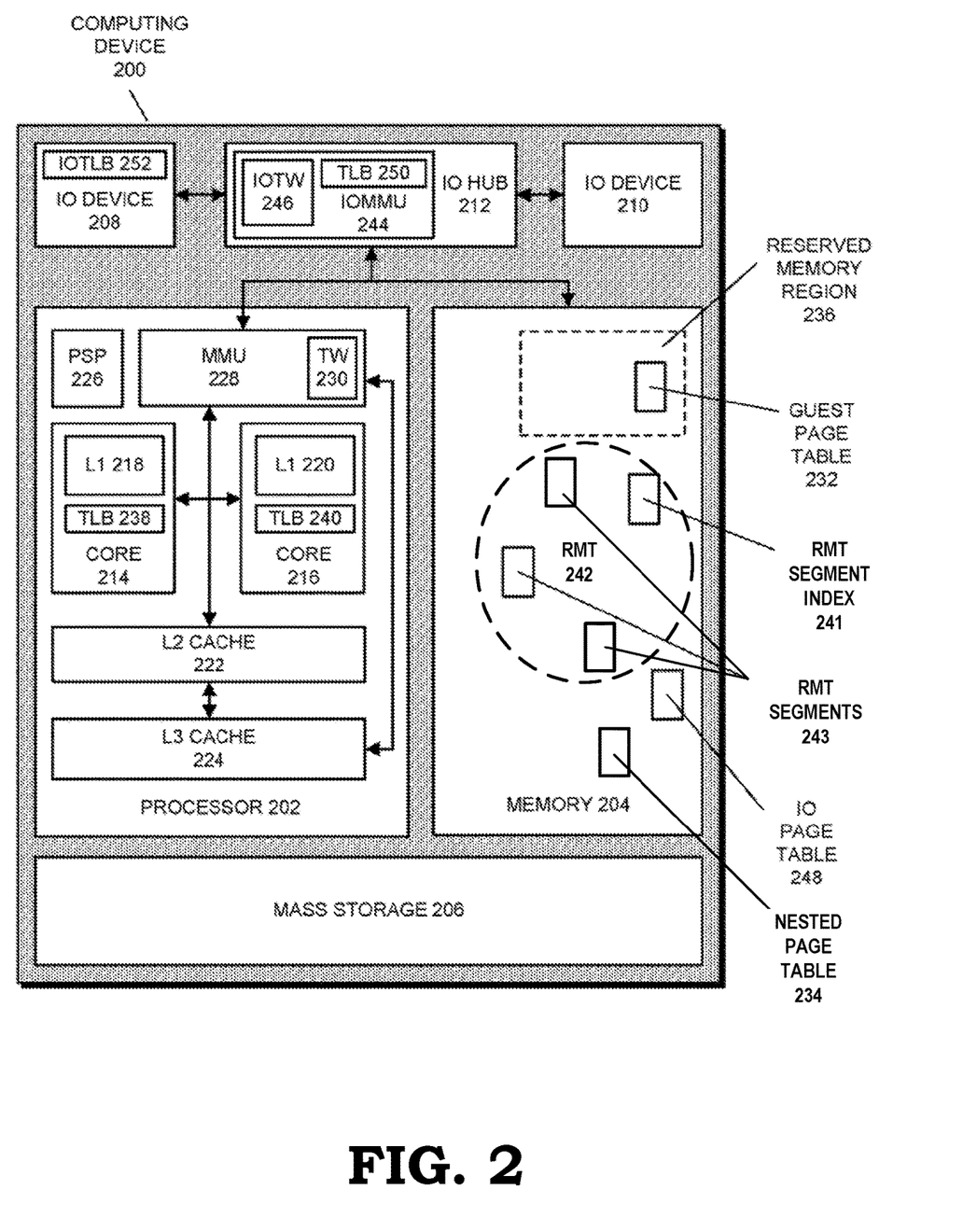
FIG. 2 presents a block diagram illustrating a computing device in accordance with some embodiments.

FIG. 2 presents a block diagram illustrating a computing device 200 in accordance with some embodiments. In the depicted embodiment, computing device 200 includes processor 202, memory 204, mass storage 206, input-output (IO) devices 208, 210, and input-output (IO) hub 212.

Processor 202 is a functional block that performs computational operations in computing device 200. In the depicted embodiment, processor 202 includes two processing cores 214, 216, each of which includes one or more computational mechanisms such as central processing units (CPUs), graphics processing units (GPUs), embedded processors, application specific integrated circuits (ASICs), and/or other computational mechanisms. Processor 202 also includes cache memories (or caches) that are used for locally storing data and instructions that are used by processing cores 214, 216 for performing computational operations. In the depicted embodiment, the caches in processor 202 include level-one (L1) caches 218, 220 (L1 218 and L1 220) in each of processing cores 214, 216. Each L1 cache includes memory circuits such as one or more of static random access memory (SRAM), dynamic random access memory (DRAM), double data rate synchronous DRAM (DDR SDRAM), and/or other types of memory circuits for storing data and instructions for use by the corresponding processing core 214, 216, as well as control circuits for handling accesses of the data and instructions that are stored in the memory circuits. Processor 202 additionally includes a shared level-two (L2) cache 222 that includes memory circuits such as one or more of SRAM, DRAM, DDR SDRAM, and/or other types of memory circuits for storing data and instructions for use by both processing cores 214, 216, as well as control circuits for handling accesses of the data and instructions that are stored in the memory circuits. Processor 202 further includes a shared level-three (L3) cache 224 that includes memory circuits such as one or more of SRAM, DRAM, DDR SDRAM, and/or other types of memory circuits for storing data and instructions for use by both processing cores 214, 216, as well as control circuits for handling accesses of the data and instructions that are stored in the memory circuits.

Processor 202 additionally includes platform security processor (PSP) 226. Platform security processor 226 comprises a processing core, an ASIC, and/or other functional block(s) for performing security operations in computing device 200. Generally, platform security processor 226 is considered secure against malicious or erroneous behavior of hardware and software entities, and thus can be used within computing device 200 for securing operations that are susceptible to such behavior. For example, platform security processor 226 may perform operations associated with enabling a trusted execution environment (TEE) in computing device 200, such as performing encryption operations (e.g., key generation, encryption/decryption of data, etc.), registration and/or authentication of hardware and software entities, etc. In some embodiments, platform security processor 226 performs at least some of the operations described herein for controlling access by virtual machines and I/O devices to pages in memory 204.

Memory 204 is a memory in computing device 200 (e.g., a "main" memory), and includes memory circuits such as one or more of DRAM, DDR SDRAM, non-volatile random access memory (NVRAM), and/or other types of memory circuits for storing data and instructions for use by functional blocks in computing device 200, as well as control circuits for handling accesses of the data and instructions that are stored in the memory circuits.

In the depicted embodiment, computing device 200 includes mass storage 206, which may include one or more of a high-capacity semiconductor memory (a non-volatile semiconductor memory such as a flash memory, an NVRAM, etc.), a disk drive (hard drive, etc.), an optical drive, and/or other data storage hardware that stores data and instructions for use by the computing device 200. In various embodiments, mass storage 206 holds data and instructions that are acquired and stored in memory 204 for subsequent use by functional blocks in computing device 200. For example, data and/or instructions may be retrieved from mass storage 206 in blocks or pages of a given size (e.g., 4 KB, 2 MB, 1 GB, etc.) and the pages can be stored in memory 204. In addition, pages may be newly created at an available physical location in memory 204 (e.g., for storing computational results, etc.). Pages retrieved from mass storage 206 and stored in memory 204 may be reserved for the exclusive access of a particular virtual machine and/or may have other access requirements (restrictions on access types, etc.).

In the depicted embodiment, memory management unit (MMU) 228 is a functional block that handles memory access requests. When data and instructions are to be accessed by a functional block in processor 202 (i.e., read, written, checked/verified, deleted, invalidated, etc. by processing core 214 or another functional block), the functional block sends a memory access request to memory management unit 228. Memory management unit 228 then sends a corresponding request to one or more of L2 cache 222, L3 cache 224, and memory 204 for satisfaction/resolution of the memory access request. For example, if data is to be retrieved based on the memory access request, memory management unit 228 may acquire the data from L2 cache 222, L3 cache 224, or memory 204 (or mass storage 206, should the data not be present in one of L2 cache 222, L3 cache 224, or memory 204) and forward the data to the requesting functional block.

In the depicted embodiment, memory management unit 228 includes a hardware table walker (TW) 230. Table walker 230 is a functional block that performs operations relating to acquiring address translations from page tables (e.g., page table walks, etc.) and checking a reverse map table to ensure that accesses by virtual machines are permissible, as described herein. More specifically, and as described above, computing device 200 uses virtual memory to enable software programs (e.g., executed by processing cores 214, 216) to access memory using virtual addresses that are translated into physical addresses. Upon receiving a memory access request from a program with a virtual address, table walker 230 performs operations for translating the virtual address into the physical address for the pages where data is located in memory 204.

In some embodiments, table walker 230 (and, more generally, memory management unit 228) uses two mechanisms for performing virtual address to physical address translations. The first of the mechanisms is a hierarchy of page tables that includes a page table associated with each virtual machine and a nested page table associated with the hypervisor. Examples of the page tables are shown in FIG. 2 as guest page table 232 and nested page table 234, which are respectively associated with a virtual machine (e.g., a VM 100 of FIG. 1) and hypervisor (e.g., hypervisor 106 of FIG. 1). Each page table is a data structure (e.g., one or more tables, an array, a list, etc.) that is stored in memory 204. For example, a guest page table 232 may be stored in a reserved memory region 236 (shown using a dashed line) that is allocated for the exclusive access of a corresponding virtual machine. In some embodiments, a given page table stores at least one translation for each page present in memory 204 that was stored in memory 204 by a corresponding program, virtual machine, etc. Thus, in these embodiments, if a page has been copied from mass storage 206 to memory 204 or newly created in memory 204 and remains available in memory 204, an associated virtual address to physical address translation should exist in a corresponding page table. As described above, table walker 230 uses guest page table 232 and nested page table 234 to perform virtual address to physical address translations.

In some embodiments, when translating a guest physical address into a system physical address based on an access request from an I/O device (e.g., I/O devices 208, 210) to access a page of memory, IO table walker 246 of the IOMMU 244 performs a table walk of the nested page table 234 to acquire, from a corresponding entry in the nested page table 234, the system physical address. It is unknown whether the nested page table (and thus the corresponding entry) has been modified, and so it is unknown whether the system physical address is properly mapped to the guest physical address in the corresponding entry. Therefore, the IO table walker 246 performs various checks in the RMT 242 to ensure that the system physical address specified in the corresponding entry is properly mapped to the guest physical address, and that the requesting I/O device is permitted to access the corresponding page. For example, in certain embodiments the IO table walker 246 determines whether an entry (corresponding to the system physical address) in the RMT 242 has a recorded guest physical address that matches the guest physical address from the request. If the recorded guest physical address from the RMT does not match the guest physical address from the request, the system physical address is improperly mapped to the guest physical address in the nested page table 234, in which case the IO table walker 246 responds by halting or failing the translation and signaling an error message or fault to the requesting I/O device 208, 210. On the other hand, when the guest physical addresses match, the system physical address is properly mapped to the guest physical address in the nested page table 234. When the system physical address is properly mapped, the outcomes of one or more other checks of the information in the RMT 242 are used to determine whether the system physical address is to be used for performing the requested access for the I/O device.

The second of the mechanisms for performing virtual address to physical address translations is translation lookaside buffers 238, 240 (TLB 238, 240), which are caches in each of processing core 214, 216 that are configured to store/cache virtual address to physical address translation information acquired during page table walks. Processing cores 214, 216 acquire virtual address to physical address translation information from the corresponding TLB 238, 240, when possible, to avoid performing a page table walk.

Computing device 200 includes multiple portions of the memory 204 that are allocated for use as a reverse map table 242. In particular, in the depicted embodiment the RMT 242 includes a single RMT segment index 241 and multiple RMT segments 243. Each allocated portion of the RMT 242 is a data structure (e.g., a table, a list, etc.) that includes a number of entries, as discussed in greater detail below. For ease of illustration, discussions herein generically refer to such data structures as tables, but it will be appreciated that any suitable data structure may be utilized.

In certain embodiments, the RMT 242 includes a single RMT segment index 241 that maps all of the multiple RMT segments 243 (e.g., up to 512 such segments), with the RMT segments 243 collectively including one entry for each page of memory in memory 204 that may be allocated for the use of one or more virtual machines. For example, if the memory 204 includes 32 GB of memory that may be allocated in 4 kB pages to virtual machines, the reverse map table 242 includes a total of 8,388,608 entries, stored across the RMT segments 243. Reverse map table 242 is used by a hypervisor (e.g., hypervisor 106 of FIG. 1) and other entities for keeping records that include information indicating, in at least the depicted embodiment, guest physical addresses that are associated with system physical addresses, of the permission levels for accessing virtual machines, of validations of pages by virtual machines, of immutable pages, and/or of other information associated with corresponding pages. In this way, computing device 200 maintains a record that can be used to detect when changes are made to the nested page table 234 and otherwise protect pages of memory from impermissible accesses by virtual machines and/or I/O devices. Reverse map table 242 is described in more detail below.

In some embodiments, the hypervisor is prevented from directly accessing reverse map table 242. For example, reverse map table 242 may be stored in memory region(s) to which the hypervisor does not have direct access, and/or may be marked as immutable in reverse map table 242 (e.g., such that the page(s) in which reverse map table 242 is stored in memory may themselves be marked as immutable). As another example, reverse map table 242 may be encrypted into a form that is not directly decryptable by the hypervisor. In some embodiments, reverse map table 242 is stored in one or more regions of memory that are not directly accessible to the hypervisor and encrypted. Although no "direct" access is permitted to reverse map table 242 by the hypervisor, the hypervisor may cause other elements or entities in computing device 200 (such as processors, etc.) to perform operations on the tables and use the information in the tables. For example, dedicated instructions may be supported that enable the hypervisor (and other entities) to cause computing device 200 to update or adjust entries in reverse map table 242.

Input-output (IO) devices 208, 210 are devices or functional blocks that perform, in the course of corresponding device operations, accesses (e.g., reads, writes, copies, invalidations, etc.) of data and/or instructions in memory 204. For example, I/O devices 208, 210 may include network interface devices, disk controllers, devices coupled to corresponding wired or wireless buses or interfaces (e.g., a Peripheral Controller Interface Express (PCIe) bus, a Universal Serial Bus (USB), a WiFi device, etc.), GPUs, etc. The particular operations performed by each of I/O devices 208, 210 depends on the nature of each I/O device. For example, assuming that I/O device 208 is a disk controller, I/O device 208 may retrieve data from a disk (such as mass storage 206) and write data into memory 204 or vice versa. As another example, assuming that I/O device 210 is a network interface device, I/O device 210 may store data received via a network in memory 204 or acquire data from memory 204 to be transmitted in a packet, data unit, etc. to a receiving device over the network. As another example, assuming that I/O device 210 is a GPU, I/O device 210 may perform operations for rendering graphics or other information for display and/or may perform general-purpose computing operations (e.g., matrix processing operations, operations off-loaded from one of processing cores 214, 216, etc.).

IO hub 212 is an input-output hub that performs operations for interfacing between I/O devices (e.g., I/O devices 208, 210) and other functional blocks in computing device 200 (e.g., processor 202). For example, in some embodiments, input-output memory management unit (IOMMU) 244 in IO hub 212 performs operations to enable I/O devices to access memory 204. In these embodiments, when data and instructions are to be accessed by an I/O device in memory 204 (i.e., read, written, checked/verified, deleted, invalidated, etc.), the I/O device sends a memory access request (e.g., a direct memory access request or DMA) to IOMMU 244. IOMMU 244 then sends a corresponding request to memory 204 for satisfaction/resolution of the memory access request. For example, if data is to be retrieved based on the memory access request, IOMMU 244 may acquire the data from memory 204 (or mass storage 206, should the data not be present in memory 204) and forward the data to the requesting I/O device.

In some embodiments, and as described above, I/O devices use the virtual memory technique for addressing memory. IOMMU 244 therefore includes mechanisms for enabling I/O devices to access memory using virtual memory operations. The IO table walker 246 is one such mechanism. IO table walker 246 is a functional block that performs operations relating to acquiring address translations from page tables (e.g., page table walks, etc.). IO table walker 246 uses a hierarchy of page tables that includes a page table associated with IOMMU 244 and the nested page table associated with the hypervisor. Examples of the page tables are shown in FIG. 2 as input-output (IO) page table 248 and nested page table 234, which are associated with IOMMU 244 and the hypervisor, respectively. IO page table 248 is a data structure (e.g., one or more tables, an array, a list, etc.) that is stored in memory 204. For example, IO page table 248 may be stored in a protected/encrypted area of memory that is inaccessible to the hypervisor (and other entities in computing device 200). In some embodiments, IO page table 248 stores at least one translation for each page present in memory 204 that was stored in memory 204 by or otherwise accessed by an I/O device. As described above, IO table walker 246 uses IO page table 248 and nested page table 234 to perform virtual address to physical address translations.

IOMMU 244 also includes translation lookaside buffer 250 (TLB 250), which is a cache in IOMMU 244 that is configured to store/cache virtual address to physical address translation information acquired during page table walks. IOMMU 244 acquires virtual address to physical address translation information from the corresponding TLB, when possible, to avoid performing a page table walk. In some embodiments, I/O devices (e.g., I/O device 208) may include local TLBs such as IOTLB 252, which can be used by the I/O devices alone or in combination with TLB 250 in IOMMU 244 to store virtual address to physical address translation information.

In some embodiments, I/O devices 208, 210 can be provided access to pages of memory allocated to virtual machines—i.e., to pages of memory that are reserved for the exclusive use of particular virtual machines, which can be called "private" pages of memory. For example—and continuing the example of I/O device 208 being a disk controller—I/O device 208 may perform a direct memory access (DMA) operation to write data in a page of memory that is allocated to a particular virtual machine. In these embodiments, IOMMU 244 and/or I/O devices 208, 210 perform operations to ensure that accesses of pages owned by virtual machines are permissible and to otherwise enable the accesses. For example, IO table walker 246, when translating virtual addresses to physical addresses, checks reverse map table 242 to ensure that accesses by I/O devices are permissible, as described herein. As another example, in embodiments where pages owned by virtual machines are encrypted, IOMMU 244 and/or I/O devices 208, 210 use corresponding keys, etc. to encrypt and decrypt information retrieved from or destined for the pages.

In some embodiments, communication paths are coupled between the various functional blocks in computing device 200 (processing cores 214, 216, memory management unit 228, memory 204, etc.), as shown by arrow-headed lines between the elements. Communication paths include one or more buses, wires, guides, and/or other connections possibly along with controllers, fabric elements (switches, routers, etc.), circuit elements, etc. The communication paths are used to route commands, data, control signals, and/or other information between the functional blocks. For example, in some embodiments, a coherent bus fabric is coupled between IO hub 212, processor 202 (e.g., MMU 228), and memory 204. It will be appreciated that various communication paths are omitted from FIG. 2 for purposes of clarity.

It will be appreciated that although specific embodiments discussed herein include a particular arrangement of processing cores, various embodiments include a different number and/or arrangement of processing cores. For example, some embodiments have only one processing core, while other embodiments have five, eight, or another number of processing cores. Generally, the described embodiments can use any arrangement of processing cores that can perform the operations herein described.

Similarly, although embodiments are described herein as having a particular arrangement of caches, various embodiments include a different number and/or arrangement of caches. For example, some or all of the caches (e.g., L1 cache 218, 220, etc.) may be divided into separate instruction and data caches. Additionally, L2 cache 222 may not be shared, and hence may only be used by a single processing core (i.e., there may be two L2 caches in processor 202). As another example, some embodiments include different levels of caches, from only one level of cache to multiple levels of caches, and these caches may be located in processor 202 and/or external to processor 202. Generally, the described embodiments can use any arrangement of caches that can be used to perform the operations herein described.

Although computing device 200 and processor 202 are simplified for illustrative purposes in FIG. 2, in some embodiments, computing device 200 and/or processor 202 include additional or different elements and mechanisms for performing the operations herein described and other operations. For example, computing device 200 and/or processor 202 may include one or more power controllers, batteries, media processors, input-output mechanisms, communication mechanisms, networking mechanisms, display mechanisms, etc.

Processor 202, memory 204, mass storage 206, and I/O devices 208, 210 are some examples of "hardware" that may be represented by computing device hardware 110 and I/O devices 114 in FIG. 1. In some embodiments, therefore, host operating system 108, IOMMU 112, and/or hypervisor 106 interface between processor 202, memory 204, mass storage 206, and I/O devices 208, 210 and virtual machines 100, guest operating systems 102, and programs 104. In these embodiments, computing device 200 (e.g., processing cores 214, 216, etc.) executes hypervisor 106, virtual machines 100, guest operating systems 102, and programs 104, as well as host operating system 108, in embodiments in which host operating system 108 is present. In addition, references to "the computing device" and elements within the computing device in this description may refer to computing device 200 and the associated elements.

In some embodiments, functional blocks shown separately in FIG. 2 are implemented together. For example, in a "system on a chip" embodiment, some or all of IO hub 212 and I/O devices 208, 210 are incorporated with processor 202, such as being fabricated on the same integrated circuit chip. In other words, for such embodiments, IO hub 212 and I/O devices 208, 210 may be integrated with or located in other functional blocks.

Computing device 200 can be, or can be included in, any electronic device that performs computational operations. For example, computing device 200 can be, or can be included in, electronic devices such as desktop computers, laptop computers, wearable computing devices, tablet computers, smart phones, servers, artificial intelligence apparatuses, virtual or augmented reality equipment, network appliances, toys, audio-visual equipment, home appliances, controllers, vehicles, etc., and/or combinations thereof.

Figure 3:
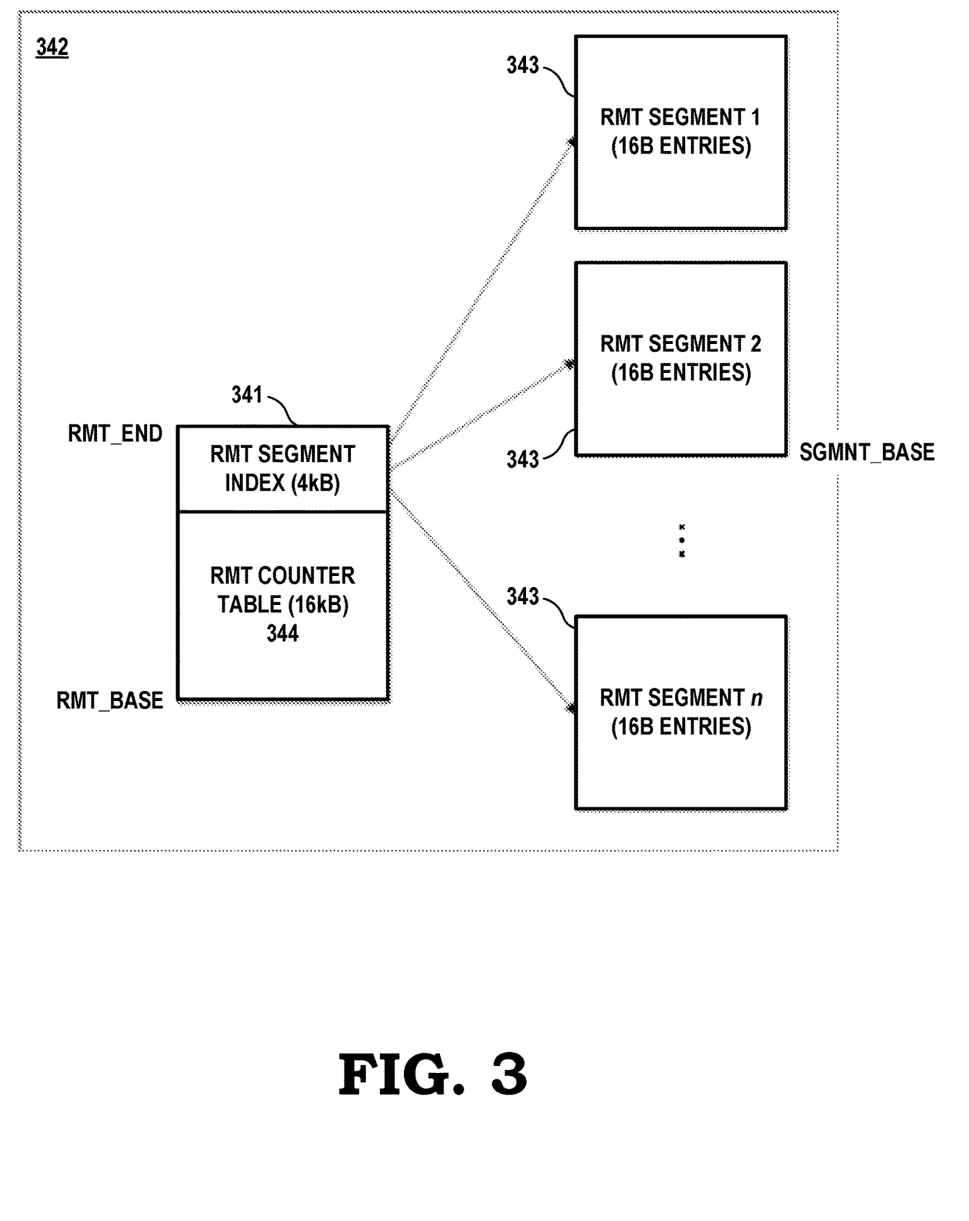
FIG. 3 illustrates a reverse map table (RMT) that includes an RMT segment index and n RMT segments in accordance with some embodiments.

FIG. 3 illustrates an RMT 342 that includes an RMT segment index 341 and n RMT segments 343. While specific configurations of the RMT 342 may be varied and flexible across multiple embodiments, various memory and storage parameters are provided in the discussion below as an example configuration for purposes of illustration.

In the depicted embodiment, each RMT segment entry is 16B in size and corresponds to a specific 4 kB page of system memory. The size and location of the RMT segment index 341 is configurable via software, such as by specifying RMT_BASE and RMT_END parameters (which respectively denote addresses that point to the beginning and end of the RMT segment index 341) as part of system and/or memory initialization. All CPUs in the system point to the same RMT segment index 341

The RMT segment index 341 includes an RMT counter table 344, which in the depicted embodiment is 16 kB in size and contains counters used to enforce security properties when changing encryption keys, and specifies up to n RMT segments 343 (e.g., n=512). Each RMT segment 343 corresponds to a certain range of physical addresses. The size of each RMT segment 343 is configurable (and in at least the depicted embodiment, substantially identical), enabling flexibility in a variety of system configurations. To access an RMT entry for a target virtual memory page address (virtual page address), a processor (e.g., processor 202 of FIG. 2) first uses a subset of bits in the virtual page address to identify the relevant RMT segment index entry for the virtual page address; the processor then identifies the RMT entry corresponding to the physical page address based on a base memory address specified by the RMT segment index (e.g., the SGMNT_BASE parameter for RMT segment 2) and additional bits of the virtual page address.

As described in greater detail below with respect to FIG. 4, within each RMT segment 343, each system physical address corresponds to a single RMT entry. While the depicted embodiment allows for a maximum of n=512 RMT segments 343, the actual number of NUMA nodes in a typical system is much less. To improve RMT lookup performance, hardware may cache information about a number of RMT segments, such that the RMT segment index does not need to be consulted on each lookup. Under example system configurations, valid entries in the RMT segment index are fully cached by hardware, resulting in substantially negligible overall performance impact. In certain embodiments, each individual RMT segment 343 maps to a single NUMA node; for best performance the RMT segment 343 is present on the same NUMA node as the memory page entries it describes.

In the example configuration, the 1 TB system described above is configured such that each RMT segment is allocated a size of 2 GB to map 512 GB of memory. Entries of the first segment (e.g., RMT Segment 1) therefore describe memory from 0-512 GB (with a 2 GB RMT table). The second segment that describes memory from 512 GB-1 TB is invalid (since no memory exists at those system addresses). And the third and final segment describes memory from 1 TB-1.5 TB (with a 2 GB RMT).

In the depicted embodiment, configuring of the segmented RMT 342 is provided via a variety of specified non-exclusive example parameters. In particular, such parameters here include a minimum supported RMT segment size; a maximum supported RMT segment size; a number of RMT segment definitions that the CPU is capable of caching; and whether the number of cached segments is a hard limit. Typically, the minimum and maximum sizes of RMT segments are expressed as a power of 2. For example, a minimum segment size of 4 GB may be stored as 32 (as $2^{32}$=4 GB). The segment size refers to the amount of system physical addresses covered by one entry in the RMT segment index 341. It will be appreciated that the maximum segment size will be greater than or equal to the minimum segment size; moreover, if they are equal, only a single segment size will be supported.

Continuing with respect to the example configuration of FIG. 3, an example lookup operation for system physical page address X in the segmented RMT 342 is performed as follows:

Compute RMTIndex=X[RMTSegmentSize+8: RMTSegmentSize]

Read the 8B RMT segment index entry at RMT_BASE+ 0x4000+RMTIndex*8

If X[RMTSegmentSize-1:30]>=MappedSize, then no RMT entry is associated with this address If SGMNT_BASE is not a valid physical address, then terminate the tablewalk (e.g., with a reserved bit fault)

Access the 16B RMT entry at {RmtSegmentBase, 20'b0}+{X[RMTSegmentSize-1:12], 4'b0}

In certain embodiments, if no RMT entry is associated with the physical address X, that physical address X is considered part of a hypervisor-owned page.

Figure 4:
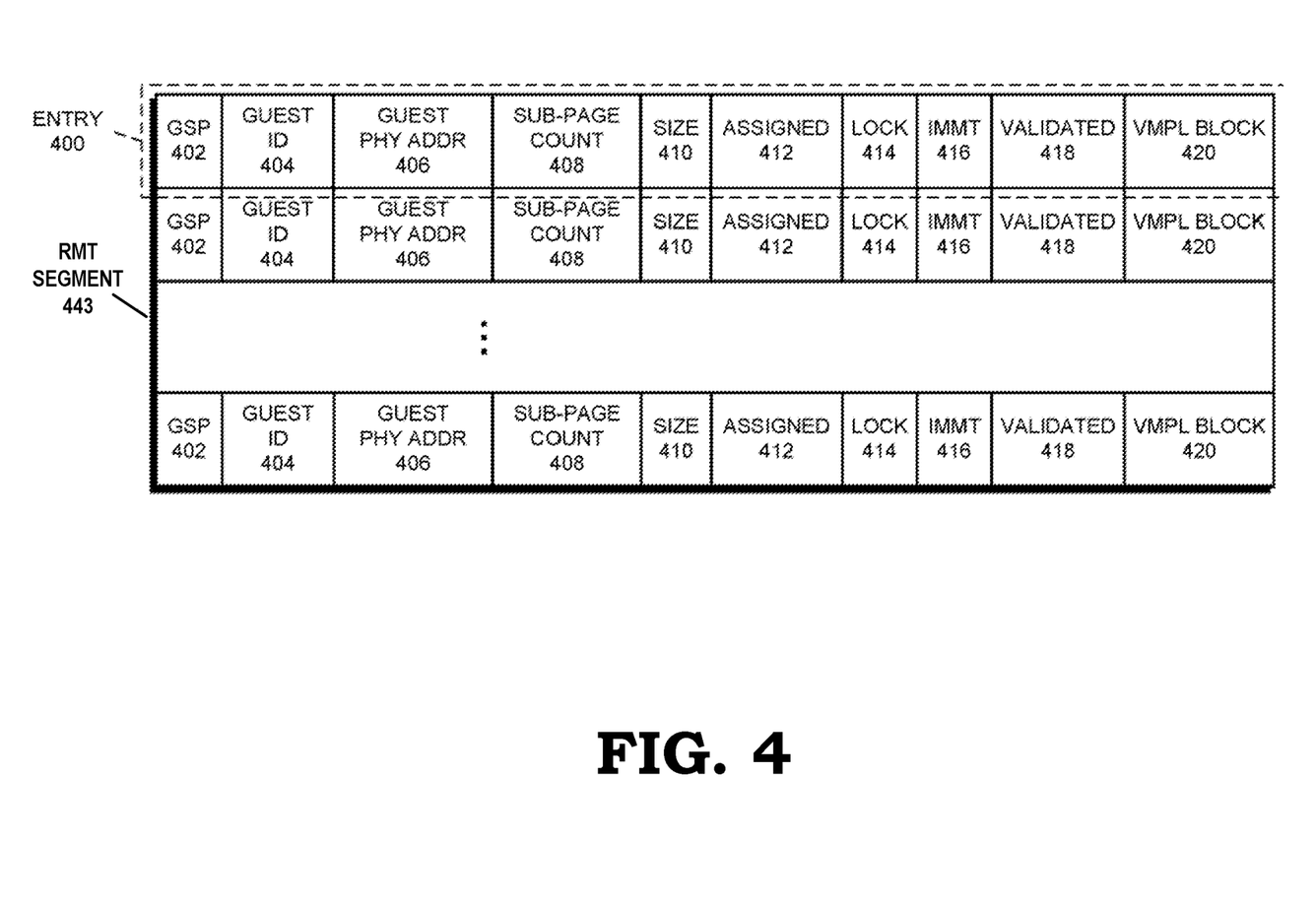
FIG. 4 presents a block diagram illustrating an expanded view of an example RMT segment in accordance with some embodiments.

FIG. 4 presents a block diagram illustrating an expanded view of an example RMT segment 443 (which may be substantially similar in various aspects to one or more of RMT segments 243 of FIG. 2 and/or RMT segments 343 of FIG. 3) in accordance with some embodiments. Although the depicted embodiment shows RMT segment 443 as including particular specified information, in various embodiments, one or more different arrangements or types of information may be included. Generally, the entries 400 in RMT segment 443 include sufficient information to perform the operations described herein.

In the depicted embodiment, the RMT segment 443 includes a number of entries 400 (an entry 400 is highlighted using a dashed line in FIG. 4). Each entry in RMT segment 443 includes information about a corresponding page in memory 204 (e.g., each 4 KB or 2 MB page in memory that may be allocated for use by one or more virtual machines). The entries in RMT segment 443 are indexed using system physical addresses associated with each page, so that each entry is associated with a particular system physical address. For example, for 4 kB pages, a first entry in RMT segment 443 is associated with a first or lowest allocatable system physical address (address A), a second entry is associated with a second allocatable system physical address (address A+4 KB), and so forth. In this way, when a particular system physical address is looked up in RMT segment 443, an entry at a corresponding offset in RMT segment 443 is looked up. In some embodiments, a base address of RMT segment 443 is recorded in a specified, and possibly secure, location in computing device 200 to enable the offset-based lookups.

In RMT segment 443, each entry 400 is configured to store global shared pages indicator (GSP) 402, guest identifier (GUEST ID) 404, guest physical address (GUEST PHY ADDR) 406, sub-page count 408, size indicator 410, assigned indicator 412, lock indicator 414, immutable indicator (IMMT) 416, validated indicator 418, and virtual machine permissions level (VMPL) block 420.

Global shared pages indicator 402 is an indicator of whether the corresponding page is shared by two or more virtual machines. Generally, when a page is shared, that page may be accessed (typically in a read-only manner) by two or more virtual machines.

Guest identifier 404 is an identifier associated with a virtual machine to which the corresponding page is allocated. For example, when the corresponding page is allocated for the use of a particular virtual machine, an identifier for the particular virtual machine is recorded in guest identifier 404. Guest identifier 404 may hold an address space identifier (ASID), an ID string, a name, and/or another value that identifies a virtual machine—or that identifies the page as being allocated to a hypervisor, shared among multiple virtual machines, or otherwise allocated.

Guest physical address 406 is a value that represents a guest physical address that is associated with the system physical address for the entry. For example, when a page at a given system physical address is allocated for the use of a virtual machine, assigned to the virtual machine, etc., the guest physical address to be used by the virtual machine for addressing the page is recorded in the corresponding entry 400 in RMT segment 443. In this way, a record is made of the particular guest physical address to be used by the virtual machine for which each page is allocated. Recording this information enables a table walker (e.g., table walker 230 or IO table walker 246) to determine, when checking a system physical address acquired during a walk of the nested page table, whether the system physical address maps to the expected guest physical address, i.e., whether the system physical address has been mapped to two different guest physical addresses at the same time. This can enable detecting whether the mapping has been changed maliciously or erroneously by a hypervisor or another entity.

Sub-page count 408 is a count of smaller-sized pages allocated for virtual machine(s) within a larger-sized page. For example, in a system that supports 2 MB pages and 4 kB pages, a page on a 2 MB boundary (e.g., pages at addresses A, A+2 MB, A+4 MB, etc.) can have a count of 4 kB pages within the 2 MB page that have been allocated for use by a virtual machine. The sub-page count value is used to determine whether an access to a larger-sized page is impermissible given that smaller pages have been allocated within the larger-sized page. In other words, sub-page count 408 is used to avoid an impermissible access to the corresponding page using an improper page size.

Size indicator 410 is an expected size for an access of a corresponding page. For example, assuming 4 kB pages and 2 MB pages are used in computing device 200, size indicator 410 indicates which size of an access is associated with the corresponding page. Size indicator 410 enables detection of impermissibly-sized accesses such as a 2 MB access of what is actually a 4 kB page or vice versa.

Assigned indicator 412 is an indicator of whether the entry 400 is currently assigned to one or more virtual machines. Assigned indicator 412 is used to prevent the use of information from entries 400 in RMT segment 443 that are not presently allocated, but may still contain old information (undeleted information, random bit patterns, etc.), that are initialized, but do not contain actual information, etc. In some embodiments, assigned indicator 412 is set when a page is currently allocated to a virtual machine and is unset/cleared when the page is deallocated from the virtual machine.

Lock indicator 414 is an indicator of whether the entry 400 is locked. When lock indicator 414 is set, the entry 400 is considered to be locked, and when lock indicator 414 is unset/cleared, the entry 400 is considered to be free or available. Once the entry 400 has been locked by a given hardware or software entity, other hardware and software entities in computing device 200 are prevented from accessing the entry 400 (e.g., reading, writing/updating, etc. the entry 400). In contrast, any hardware and software entity can be permitted to access a free/available entry (possibly after setting lock indicator 414). For example, in an embodiment where lock indicator 414 is a single bit and is initially clear (e.g., set to zero), an entity may set lock indicator 414 (e.g., to 1), access the entry 400 one or more times, and then clear lock indicator 414 when finished accessing the entry 400. Using lock indicator 414, the described embodiments can avoid race conditions and other conditions where simultaneous reads and/or writes may occur for the entry 400.

Immutable indicator 416 is an indicator of whether the corresponding page is immutable. When a page is marked as immutable using the corresponding immutable indicator 416, the page cannot be written to by a software entity (e.g., hypervisor, guest operating system, application program, etc.) that is executing on a core (e.g., cores 214-216). In other words, an immutable page is prevented from being wholly or partially rewritten, updated, or amended, added to or removed from, etc. by any of the software entities. In addition, immutable pages are to be deallocated by a platform security processor (e.g., platform security processor 226), and cannot be deallocated by a core, including a core acting on behalf of or under the control of a software entity executing thereon (e.g., a hypervisor, etc.). Immutable pages are described in more detail in U.S. patent application Ser. No. 15/417,632, which is, as described above, incorporated by reference herein.

Validated indicator 418 is an indicator of whether entry 400 has been validated by a virtual machine (i.e., a virtual machine to which a corresponding page is allocated). The virtual machine updates validated indicator 418 (e.g., sets one or more bits of validated indicator 418 to a specified value such as 1) to indicate that entry 400 is validated, thereby "marking" entry 400 as validated. For example, the virtual machine may immediately validate corresponding entries in RMT segment 443 upon being allocated pages, or may delay validation, such as validating entries when initially accessing pages or upon receiving validation faults for the pages. In some embodiments, the virtual machine executes a dedicated instruction to perform the validating/update validated indicator 418. Validated indicator 418 is cleared when entry 400 is updated, such as when a hypervisor changes information in entry 400. During operation, the table walker determines, based on the set/cleared state of validated indicator 418, whether or not the virtual machine has validated entry 400.

Virtual machine permissions level (VMPL) block 420 includes sets of permissions for a number of permissions levels for the page associated with entry 400. In some embodiments, computing device 200 supports two or more permissions levels, each permissions level being associated with permissions (e.g., enabled/disabled, permitted/not permitted, etc.) for a specified set of operation types for pages in memory. The operation types can include any operation that may be performed on data in a page or with a page, such as reads of data, writes of data, execution of program code in pages, etc. For a given page, the set of permissions for each of the permissions levels may be different, so that a given operation type in a first permissions level may have a different permission than the same operation type in a second permissions level. For example, writes of data may be permitted in the first permissions level for a page, but not in the second permissions level. In some embodiments, the permissions levels are organized in a hierarchy, with "higher" permissions levels having more permissions than "lower" permissions levels.

Figure 5:
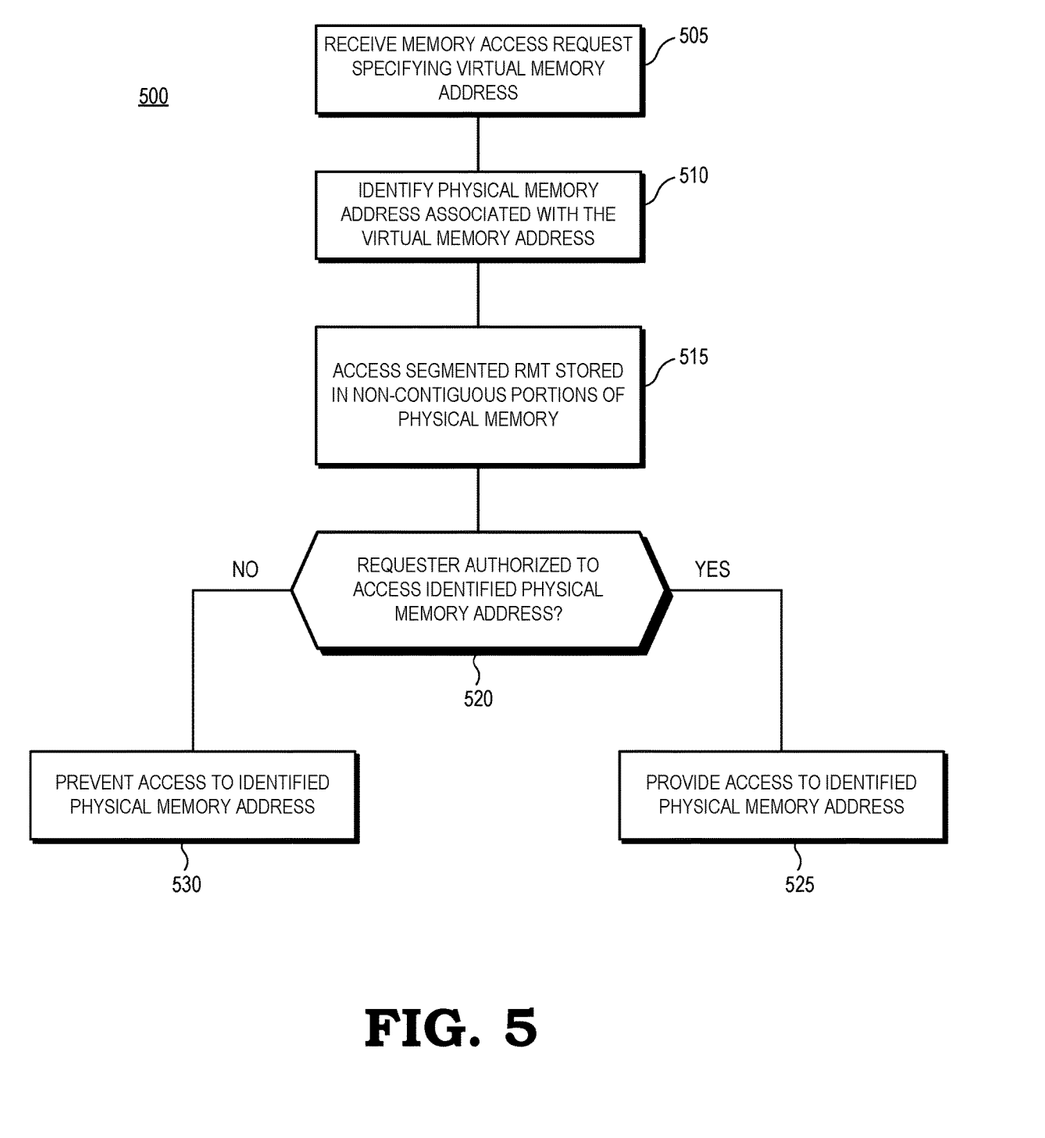
FIG. 5 illustrates a flow diagram of an operational routine suitable for handling a memory access request in a secure computing system in accordance with some embodiments.

FIG. 5 illustrates a flow diagram of an operational routine 500 suitable for handling a memory access request in a secure computing system in accordance with some embodiments.

The routine begins at block 505, in which a memory access request specifying a virtual memory address is received. The routine proceeds to block 510.

At block 510, a physical memory address associated with the specified virtual memory address is identified. The routine proceeds to block 515.

At block 515, a segmented reverse map table stored in non-contiguous portions of physical memory is accessed. The routine proceeds to block 520.

At block 520, the routine determines whether a requester associated with the memory access request received in block 505 is authorized to access the physical memory address identified in block 510. If so, the routine proceeds to block 525, in which the requester is provided access to the identified physical memory address. Otherwise, the routine proceeds to block 530, and prevents the requester from accessing the identified physical memory address.

In some embodiments, the apparatus and techniques described above are implemented in a system including one or more integrated circuit (IC) devices (also referred to as integrated circuit packages or microchips). Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for handling memory accesses in a computing system, the method comprising:
   translating a virtual memory address specified by a memory access request to a physical memory address associated with the virtual memory address; and
   providing access to the physical memory address to a requester associated with the memory access request in response to an indication at a segmented reverse map table (RMT) that the requester is authorized to access the associated physical memory address, the segmented RMT being stored in non-contiguous portions of a physical memory of the computing system and comprising an RMT segment index having multiple index entries that each correspond to one of multiple segments of the segmented RMT;
   wherein translating the specified virtual memory address comprises:
      identifying, via a first subset of bits in the specified virtual memory address, a first RMT segment index entry; and
      providing the associated physical memory address based on the identified first RMT segment index entry.

2. The method of claim 1, each segment of the multiple segments comprising a plurality of segment entries, each segment entry corresponding to a distinct physical address.

3. The method of claim 2, wherein the computing system executes one or more virtual machines that are each allocated a portion of physical memory, and wherein the segment entries of the multiple segments comprise an entirety of the physical memory that is allocated to the one or more virtual machines.

4. The method of claim 1, wherein the physical memory of the computing system includes multiple non-uniform memory access (NUMA) memory nodes, and wherein each segment of the multiple segments maps to a respective NUMA memory node.

5. The method of claim 4, wherein at least one segment of the multiple segments is stored on the respective NUMA memory node mapped by the at least one segment.

6. The method of claim 1, wherein the RMT segment index further comprises an RMT counter table including one or more counters that are each associated with one or more encryption keys.

7. The method of claim 1, wherein identifying the physical memory address is performed by a table walker of the computing system.

8. The method of claim 7, wherein the requester is an input/output (I/O) device communicatively coupled to the computing system, and wherein the table walker is a hardware table walker associated with an I/O memory management unit (IOMMU) of the computing system.

9. The method of claim 1, wherein the requester is a one of one or more VMs executing on the computing system that are each allocated a respective plurality of physical memory addresses.

10. The method of claim 1 wherein translating the specified virtual memory address comprises translating the specified virtual memory address based on a base physical memory address for a first RMT segment corresponding to the identified first RMT segment index entry.

11. A computing device comprising:
   a processor;
   a table walker; and
   a memory storing a segmented reverse map table (RMT) in multiple non-contiguous portions of the memory, the segmented RMT comprising an RMT segment index having multiple index entries that each correspond to one of multiple segments of the segmented RMT;
   wherein the table walker is configured to:
      identify, via a first subset of bits in a virtual memory address specified by a memory access request, a first RMT segment index entry;
      provide an associated physical memory address based on the identified first RMT segment index entry; and
      provide a requester associated with the memory access request with access to the associated physical memory address in response to an indication at the RMT that the requester is authorized to access the associated physical memory address.

12. The computing device of claim 11, wherein each segment of the multiple segments comprises a plurality of segment entries that each corresponds to a distinct physical address of the memory.

13. The computing device of claim 12, wherein the computing device executes one or more virtual machines that are each allocated a portion of the memory, and wherein the segment entries of the multiple segments comprise an entirety of the memory that is allocated to the one or more virtual machines.

14. The computing device of claim 11, wherein the memory includes multiple non-uniform memory access (NUMA) memory nodes, and wherein each segment of the multiple segments maps to a respective NUMA memory node.

15. The computing device of claim 14, wherein at least one segment of the multiple segments is stored on the respective NUMA memory node mapped by the at least one segment.

16. The computing device of claim 11, wherein the RMT segment index further comprises an RMT counter table that includes one or more counters, and wherein each of the one or more counters are associated with one or more encryption keys.

17. The computing device of claim 11, further comprising an input/output (I/O) memory management unit (IOMMU), wherein the requester is an I/O device communicatively coupled to the computing device, and wherein the table walker is a hardware table walker associated with the IOMMU.

18. The computing device of claim 11, further comprising one or more virtual machines executing on the computing device that are each allocated a respective plurality of physical memory addresses, and wherein the requester is one of the one or more virtual machines.

19. A computing device, configured to:
   store a segmented reverse map table (RMT) in multiple non-contiguous portions of a memory having a plurality of physical memory addresses, the segmented RMT comprising an RMT segment index comprising multiple index entries that each correspond to one of multiple segments of the segmented RMT that are stored in the non-contiguous portions of the memory;
   identify, via a first subset of bits in a specified virtual memory address, a first RMT segment index entry;
   provide an associated physical memory address based on the identified first RMT segment index entry; and
   provide a requester associated with a memory access request with access to the associated physical memory address in response to an indication at the segmented RMT that the requester is authorized to access the associated physical memory address.

20. The computing device of claim 11 wherein to provide the associated physical memory address is further based on a base physical memory address for a first RMT segment corresponding to the identified first RMT segment index entry.

\* \* \* \* \*